(12) United States Patent
Knepper

(10) Patent No.: US 7,217,132 B2
(45) Date of Patent: May 15, 2007

(54) EDUCATIONAL MEDIUM FOR TEACHING CHILDREN TO INTERACT WITH AND RECOGNIZE OBJECTS

(76) Inventor: Tory Herald Knepper, 10273 Oletha La., Los Angeles, CA (US) 90077

(*) Notice: Subject to any disclaimer, the term of this patent is extended or adjusted under 35 U.S.C. 154(b) by 92 days.

(21) Appl. No.: 10/839,603

(22) Filed: May 5, 2004

(65) Prior Publication Data

US 2005/0250079 A1 Nov. 10, 2005

(51) Int. Cl.
*G09B 1/00* (2006.01)

(52) U.S. Cl. .................. 434/159; 434/367; 434/178

(58) Field of Classification Search .............. 5/482, 5/502, 655; 446/227; 434/159, 367, 156, 434/178

See application file for complete search history.

(56) References Cited

U.S. PATENT DOCUMENTS

| | | | |
|---|---|---|---|
| 2,011,714 A | | 8/1935 | Friedman |
| 2,121,246 A | | 6/1938 | Gordon |
| 3,593,433 A | * | 7/1971 | Dillon et al. ............... 434/178 |
| 3,726,027 A | * | 4/1973 | Cohen et al. ................ 434/98 |
| 4,404,764 A | | 9/1983 | Wills et al. |
| 4,495,230 A | | 1/1985 | Ellwein |
| 4,514,175 A | * | 4/1985 | Zaruba et al. ............... 434/82 |
| 4,636,172 A | * | 1/1987 | Fredericks ................. 434/159 |
| 4,650,421 A | | 3/1987 | Anczurowski |
| 4,737,108 A | | 4/1988 | Chepaitis |
| 4,968,279 A | * | 11/1990 | Smith ........................... 446/71 |
| 5,167,565 A | * | 12/1992 | Metcalf ....................... 446/491 |
| 5,286,204 A | | 2/1994 | Minardi |
| 5,520,395 A | | 5/1996 | Mondello, Jr. |
| 5,540,609 A | * | 7/1996 | Hoag ............................ 446/26 |
| 5,720,617 A | * | 2/1998 | Var ............................. 434/247 |
| 6,106,302 A | * | 8/2000 | Schumacher ................ 434/295 |
| 6,183,335 B1 | * | 2/2001 | Petersen ..................... 446/227 |
| 6,290,230 B1 | | 9/2001 | Anthony |
| 6,427,265 B1 | * | 8/2002 | Dix ............................... 5/482 |
| 6,609,715 B2 | | 8/2003 | Anthony |
| 6,682,389 B2 | * | 1/2004 | Wells ......................... 446/227 |
| 6,684,422 B2 | * | 2/2004 | LeFevre et al. ................ 5/496 |
| 2002/0072042 A1 | * | 6/2002 | Ko ............................. 434/259 |
| 2003/0099919 A1 | * | 5/2003 | Love ........................... 434/157 |
| 2004/0067470 A1 | * | 4/2004 | Morris ........................ 434/159 |

\* cited by examiner

*Primary Examiner*—Dmitry Suhol
(74) *Attorney, Agent, or Firm*—Hankin Patent Law, APC; Marc E. Hankin

(57) ABSTRACT

A unique educational medium for teaching children to recognize various objects by sight and touch including animals, vegetables, minerals, articles, items, and environmental features according to a thematic scene associated with the medium. The medium is preferably at least one sheet of material having a surface with a plurality of objects thereon and forming a part of the thematic scene, the objects representing at least two of the group consisting of images, shapes, forms, and numbers. Tactile material forms at least a part of each object and is used to represent the actual object such that a user may touch the tactile material and recognize the object. The sheet is of a size sufficient to allow a user to walk on the sheet, cover themselves with the sheet, and identify objects on the sheet by touch.

4 Claims, 11 Drawing Sheets
(11 of 11 Drawing Sheet(s) Filed in Color)

40 Fig. 3

EDUCATIONAL MEDIUM FOR TEACHING CHILDREN TO INTERACT WITH AND RECOGNIZE OBJECTS

BACKGROUND OF THE INVENTION

1. Field of the Invention

The present invention relates in general to a medium having tactile objects thereon and specifically to an educational medium for children in the form of a sheet having thematic scenes thereon that include tactile objects and that is of sufficient size to enable the user to walk thereon, cover themselves, and to identify the tactile objects thereon by touch.

2. Prior Art

There are many patents in the prior art that disclose the use of tactile objects on a device for various purposes such as to enable the user to play a game (U.S. Pat. No. 6,290,230), to recognize colors (U.S. Pat. No. 5,286,204), or to identify shapes.

Further, there are books having tactile objects representing a cat's fur, tongue, i.d. tags, food bowl, and basket with each having a unique touch to identify the cat and objects related to it. Such a book is entitled "Touch and Feel KITTEN" published by DK Publishing Co. and copyrighted in 1999.

Another such book is entitled "Percival the Beautiful Butterfly" published by The Book Company Publishing PTY Limited and copyrighted in 2002. It has scenes of a butterfly with portions of its wings depicted by what appears to be colored cellophane.

Likewise, it appears that colored cellophane is used to represent a frog's tongue and portions of flower petals.

Another book is entitled "Fuzzy Yellow Ducklings" published by Penguin Putnam, Inc. and copyrighted 1995 by Matthew Van Fleet. Each page is a fold out having, for instance, a circle of yellow fuzz before the fold out and with the circle of yellow fuzz representing a portion of a duckling when the section is folded outwardly.

Another page has a triangle of a brown, rough surface before the fold out. After the fold out, the triangle becomes a part of a frog's back. Other pages illustrate a gray, fuzzy square associated with the back of a Koala bear, a green oval associated with an iguana lizard, a white rectangle associated with and representing the wool of sheep, a scratchy blue crescent representing a shark, and a rough pink representing a line and a frog's tongue when folded out.

There are a number of disadvantages to such prior art devices. First, there is no thematic scene associated with the "touch" books. It is simply a single page with a single thought represented on the page. For instance, the entire alphabet cannot be presented simultaneously in a tactile form to allow interaction with the user.

Second, the user, or child, cannot become a part of the scene. The child cannot sit on sand, see a boat on the sea, the clouds in the sky, the fish in the water, and the like as one theme.

Third, the user, the child, cannot sleep under it, or feel the image (texture) while interacting with the scene.

Fourth, for little children, there is little, if anything, to hold their attention for any significant period of time.

SUMMARY OF THE INVENTION

The present invention provides an educational medium for teaching children to recognize various objects by sight and touch according to a theme associated with the medium. It comprises at least one single sheet of material having a surface with a plurality of three-dimensional objects forming a part thereof, the objects forming the thematic scene representing at least two of the group consisting of images, shapes, forms, and numbers. Each object forms a permanent part of the medium and relates the other objects to form the thematic scene. Tactile material forms at least a part of each object and is formed of a unique material that is used to represent the actual object such that a user may touch the tactile material to recognize the object.

The sheet is of sufficient size to allow a user to walk on the sheet, cover themselves with the sheet, and to form a theme such as the beach, a zoo, alphabet and numbers, and the like.

In one embodiment, the sheet has a front portion and a back portion attached to each other and stuffed with a noise-making material to hold a child's attention.

In another embodiment, sections having a particular color are formed on the sheet with an object permanently attached to each section. At least a portion of each object is tactile to enable a user to identify it by touch. A stuffed three-dimensional colored letter is associated with the object and is pivotally attached to each section to allow the stuffed letter to be raised thereby enabling the user to see and touch the tactile material of the object represented by the stuffed letter. In one preferred embodiment, the stuffed letter is the first letter of a word identifying the object. Further, at least some of the stuffed letters may contain a noise-making material to hold a child's attention.

In one embodiment, the thematic scene is formed with a first section having a scene representing a sea shore, a second adjacent section having a scene representing the sea, and a third section adjacent to both the first and second sections and forming a scene representing the sky. Each of the first, second, and third scenes has at least one tactile object representing the theme of that section.

Thus, it is an object of the present invention to provide an educational medium for teaching children to recognize, by touch and sight, various objects including, but not limited to, animal, vegetables, minerals, articles, items, and environmental features according to a thematic scene associated with the medium.

It is also an object of the present invention to provide an educational medium that is formed of a single sheet of material having a surface with a plurality of objects forming a part thereof, the objects forming a thematic scene representing at least two items of the group consisting of images, shapes, forms, and numbers.

It is still another object of the present invention to provide an educational medium that has a sheet with a plurality of three-dimensional objects forming a part thereof and relating to each other to form the thematic scene. Tactile material forms a least a part of each object and is used to represent the actual object such that a user may touch the tactile material to recognize the object.

It is also an object of the present invention to provide an educational medium that includes a sheet of material having at least some objects permanently attached thereto that are interactive with the user.

It is yet another object of the invention to provide an educational medium that includes a sheet of material of a size sufficient to allow a user to walk on the sheet and cover themselves with the sheet while associating with objects that are preferably permanently attached to the sheet such as by touching or interacting with them.

It is also another object of the present invention to provide an educational medium that includes a sheet with three-dimensional objects attached thereto.

Thus the present invention relates to an educational medium for teaching children to recognize various objects including animals, vegetables, minerals, articles, items, and environmental features according to a thematic scene associated with the medium comprising at least one sheet of material having a surface with a plurality of the objects preferably forming a permanent part thereof, the objects forming a part of the thematic scene, the objects representing at least two of the group consisting of images, shapes, forms, and numbers, and tactile material forming at least a part of each object and used to represent the actual object such that a user may both touch and see the tactile material to recognize the object with the thematic scene.

BRIEF DESCRIPTION OF THE DRAWINGS

"The patent or application file contains at least one drawing executed in color. Copies of this patent or patent application publication with color drawings will be provided by the Office upon request and payment of the necessary fee."

DETAILED DESCRIPTION OF THE DRAWINGS

The present invention relates to an educational medium for teaching children to recognize various objects using sight and touch and including, but not limited to, animals, vegetables, minerals, articles, items, and environmental features according to a thematic scene associated with the medium while allowing the children to interact with the thematic scene and the tactile objects associated therewith. As used herein, the term "sheet" is intended to include, but is not limited to, a quilt/blanket/throw/covering/wall hanging.

Figure 1:
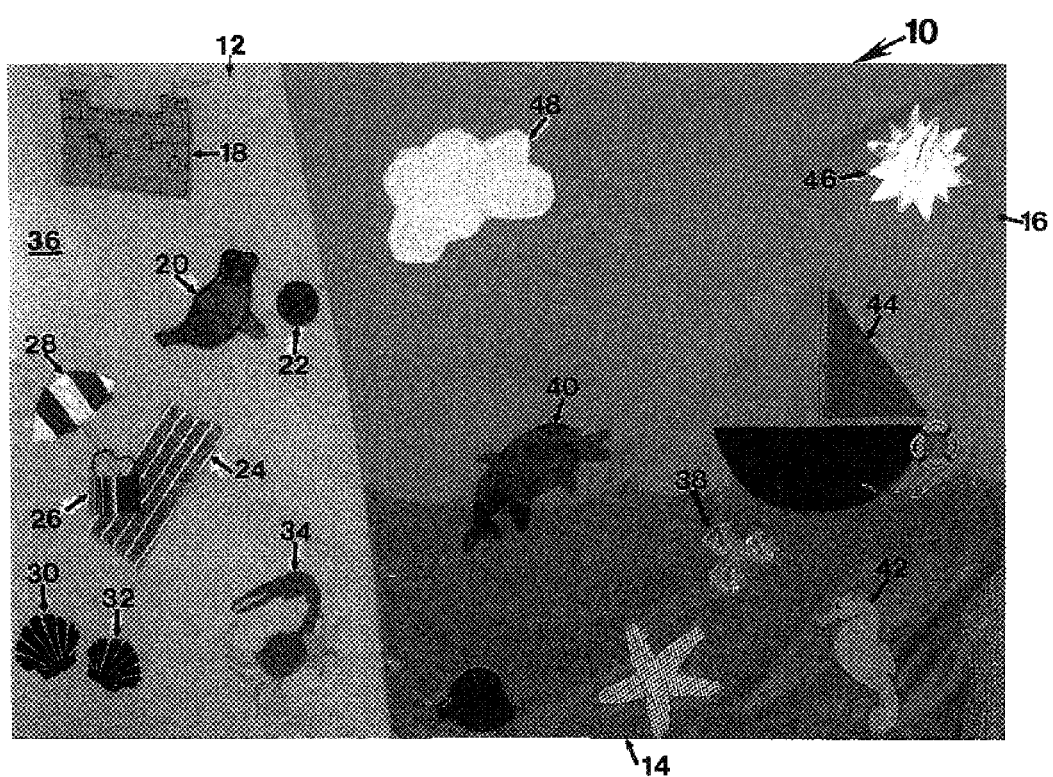
FIG. 1 is a plan view of a first embodiment including a sheet with a front and back sheet attached to each other and forming a pocket and stuffed with a soft material and including tactile objects illustrating a thematic scene of a beach including the sand, the water, and the sky.

For instance, FIG. 1 illustrates a medium in the form of a sheet 10 having thereon a thematic scene representing the beach or seashore. It has a first section 12 representing the beach, a second section 14 representing the sea or water, and a third section 16 representing the sky. It is sufficiently large to allow a user to walk on the sheet, cover them with the sheet, and identify objects attached thereto by touch.

Figure 5:
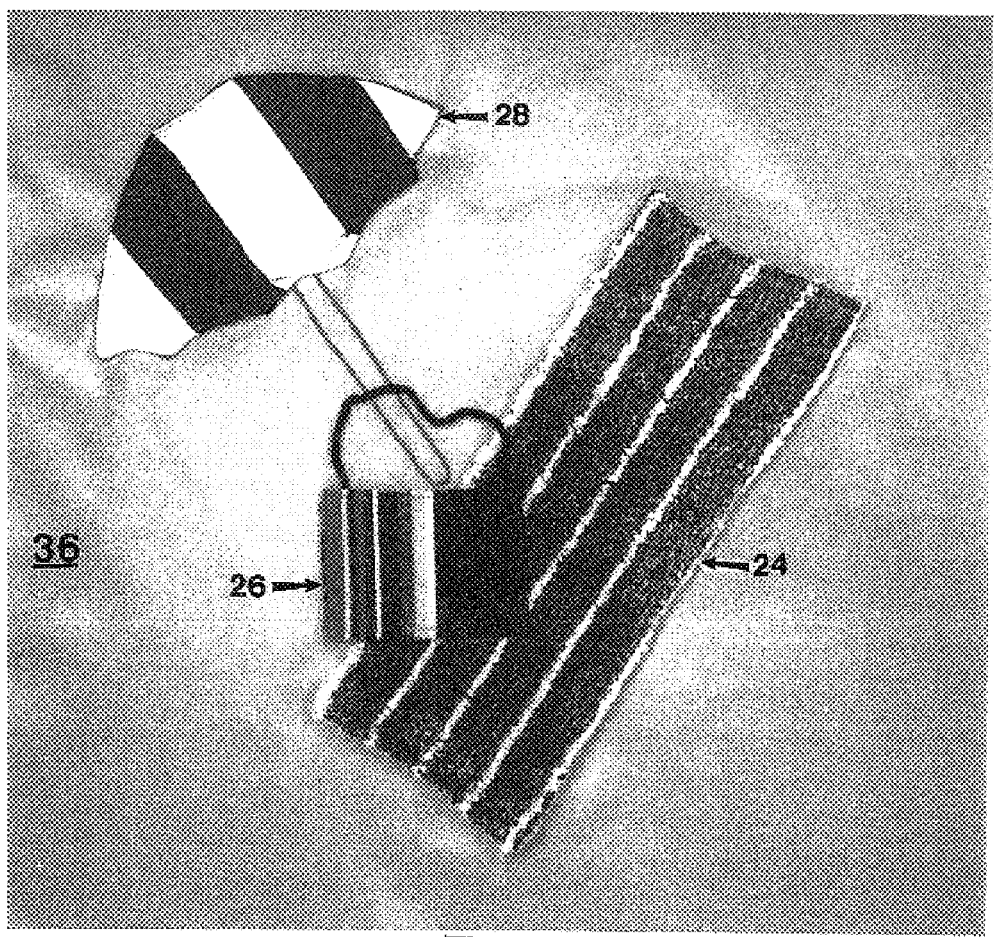
FIG. 5 is an enlarged view of part of the beach scene in FIG. 1 illustrating the beach towel, the bag, and the umbrella to better illustrate the tactile material of which they are formed.

The first section 12 representing the beach has a yellow color to represent the beach sand 36 that has permanently attached thereon at least one typical three-dimensional beach object such as a sandcastle 18, otter 20 and ball 22, a beach towel 24, beach bag 26, and a beach umbrella 28. It also shows sea shells 30 and 32 and a crab 34. Each of these items is a natural part of the thematic scene and is formed with a unique tactile material having a texture that enables the article to be identified by the touch. For instance, in FIG. 5, the beach towel 24, beach bag 28, and the umbrella 30 are shown enlarged. It can be readily seen that the beach towel 24 comprises a tufted, towel like material. The beach bag 26 comprises a rough, ribbed material, and the umbrella 28 comprises a smooth cloth material. Each of these items can be identified by the touch and its shape.

Figure 2:
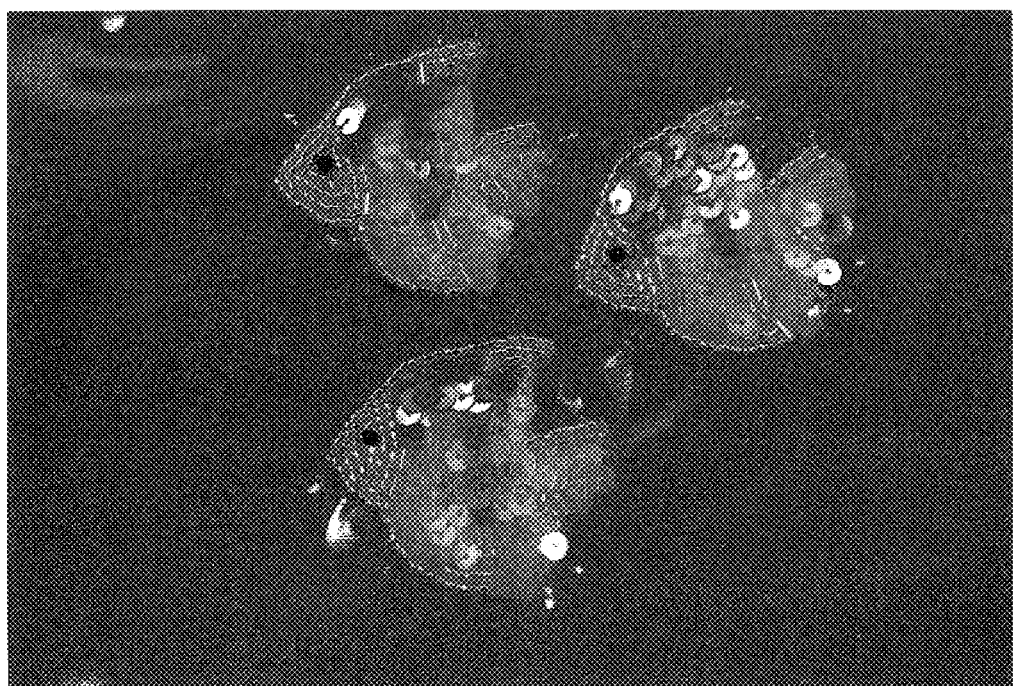
FIG. 2 is an enlarged view of fish shown in the water in FIG. 1 to better illustrate the tactile material of which they are formed.

Also in FIG. 1 can be seen the sea 14 with various items associated with the sea such as the three fish 38. They are shown enlarged in FIG. 2 to illustrate more clearly the tactile material of which they are formed. In FIG. 2 it can be seen that each of the fish 38 is formed with sequins and elongated colored beads to represent the scales of the fish. A black hemispherical bead is used to represent the eyes. Thus it can be seen that the fish 38 can also be identified by the touch.

Figure 3:
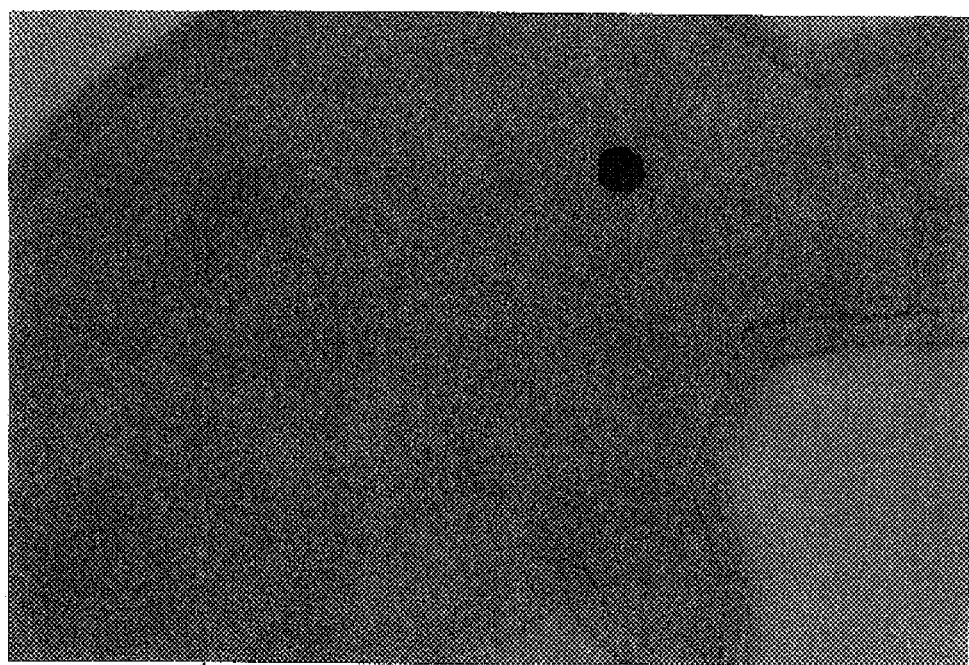
FIG. 3 is an enlarged view of the porpoise or dolphin in FIG. 1 shown partly in and partly out of the water to better illustrate the tactile material of which it is formed.

Also in FIG. 1 can be seen a dolphin 40 partly within and partly without the water. FIG. 3 is an enlarged view of the dolphin 40. It can be seen that the tactile material forming it is of a material such feels like leather that will give a smooth dolphin skin feel.

Figure 4:
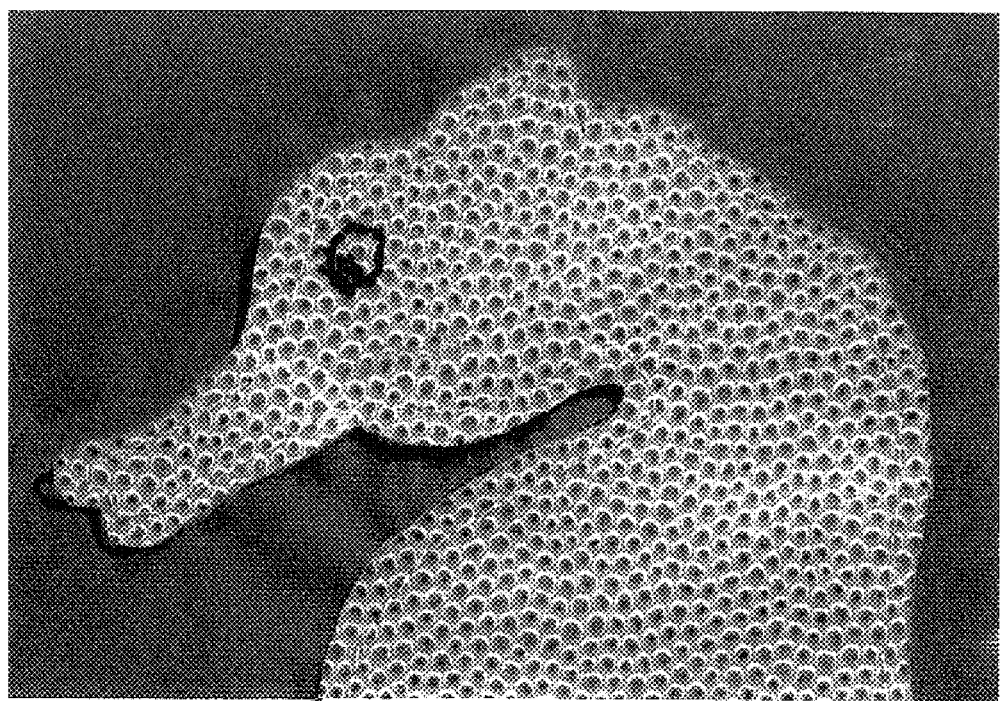
FIG. 4 is an enlarged view of the sea horse in FIG. 1 to better illustrate the tactile material of which it is formed.

A seahorse 40 can be seen in the water in FIG. 1. The enlarged view of the seahorse 40 is shown in FIG. 4. The tactile material forming the seahorse 40 can be seen to be a rough material such as imitation alligator skin that will give the "feel" of a seahorse to the one who touches it.

Also shown in FIG. 1 is a sailboat 44, the sky 16 with the sun 46, and a cloud 48. The sails and hull of the sail boat may be made of desired material such as smooth cloth. The sun 46 may be formed of any type of cloth material that has a shape representing the rays of the sun. The cloud 48 may be formed of a piece of cotton. Each of the other objects in the thematic beach scene in FIG. 1 may have a form or shape representing the actual object and may be made of a material to give a tactile sensation to the user so that the particular item may be identified both by sight and feel.

It should be noted that the sheet 10 forming the thematic scene with the three sections 12, 14, and 16 is sufficiently large that the child user may walk on the beach, wade in the water, or go to sleep under the sheet.

Figure 6:
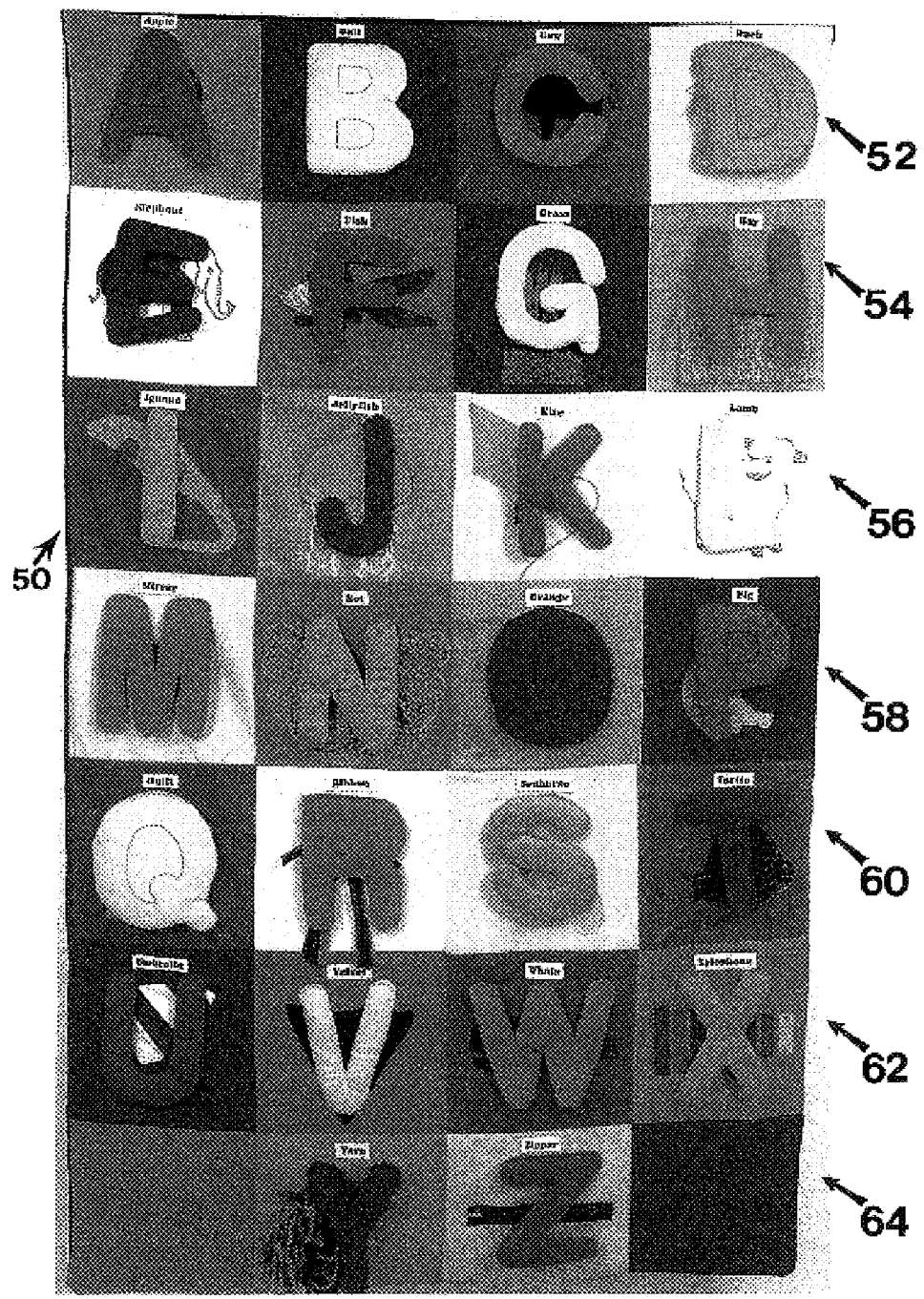
FIG. 6 is a plan view of a second embodiment of an educational medium with a front sheet and a back sheet with a soft stuffing between and having a plurality of sections of different colors, an object attached to each section with at least a portion of each object being tactile to enable a user to identify it by touch, and a stuffed three-dimensional colored letter pivotally attached at one end to each section to allow the stuffed letter to be raised thereby enabling the user to see and touch the object represented by the stuffed letter.

FIG. 6 illustrates another thematic scene in which the alphabet is presented. Note that the sheet 50 has a plurality of sections with 4 sections in 7 rows 52–64. Each section has its own color and has an object attached thereto with each object starting with a consecutive letter of the alphabet. For instance, in the first row 52, the first column, there is an "apple" covered by the stuffed colored letter "A". The stuffed letter "A" is hingedly attached to the top of its section so that it can be lifted upwardly about the hinge so that the apple can be seen and touched by the user. The material representing the skin of the apple can be of any smooth red material. All letters of the alphabet are shown in FIG. 6. Some of the letters are shown enlarged in FIGS. 7–11 to illustrate the tactile material forming the object representing the object.

Figure 7:
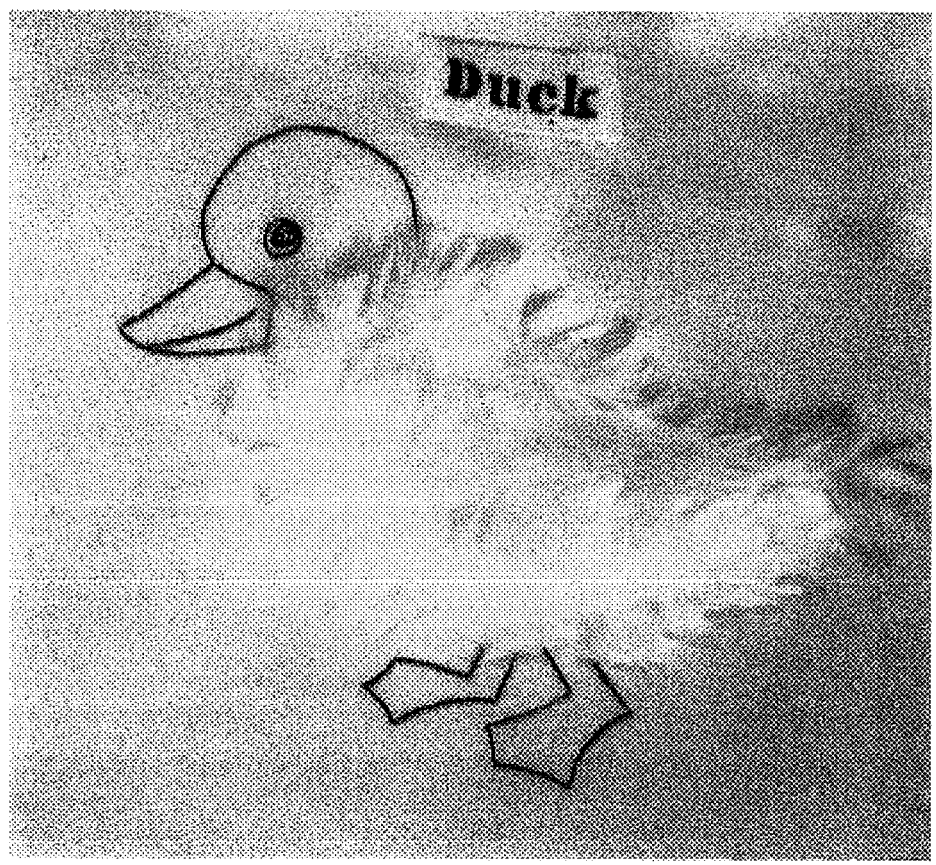
FIG. 7 is an enlarged view of the duck under the letter "D" in FIG. 6 to better illustrate the tactile material used to represent the feathers thereof.

FIG. 7 is an enlarged view of the duck under the letter "D" in FIG. 6. Note that the tactile material used to represent the feathers of the duck may be a downy material of any type.

Figure 8:
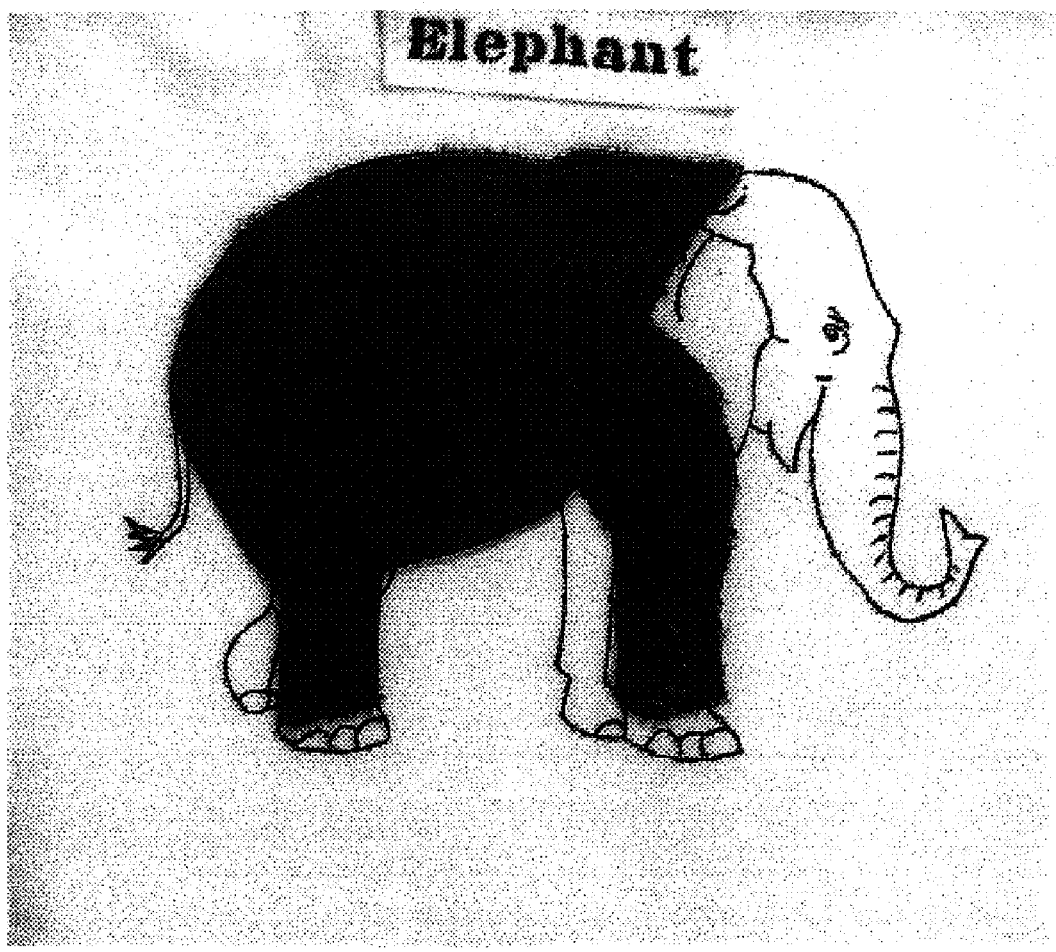
FIG. 8 is an enlarged view of the elephant under the letter "E" in FIG. 6 to better illustrate the tactile material used to represent the hide thereof.

FIG. 8 is an enlarged view of the elephant under the letter "E" in FIG. 6. Note that this material may be rough like a leather tactile material to represent the skin of the elephant.

Figure 9:
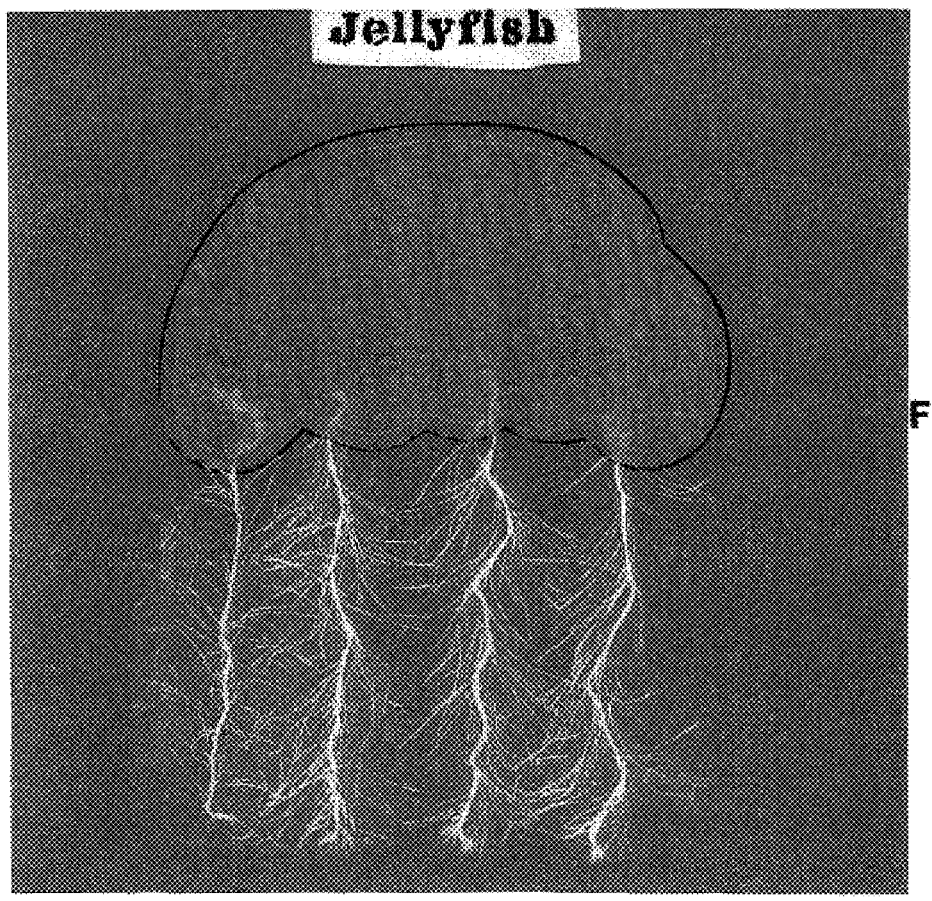
FIG. 9 is an enlarged view of a jellyfish under the letter "J" in FIG. 6 to better illustrate the tactile material used to represent the jellyfish.

FIG. 9 is an enlarged view of the jellyfish under the letter "J" in FIG. 6. The tentacles of the jellyfish may be represented by silken threads and the body of the jellyfish may be represented by any desired smooth colored tactile material.

Figure 10:
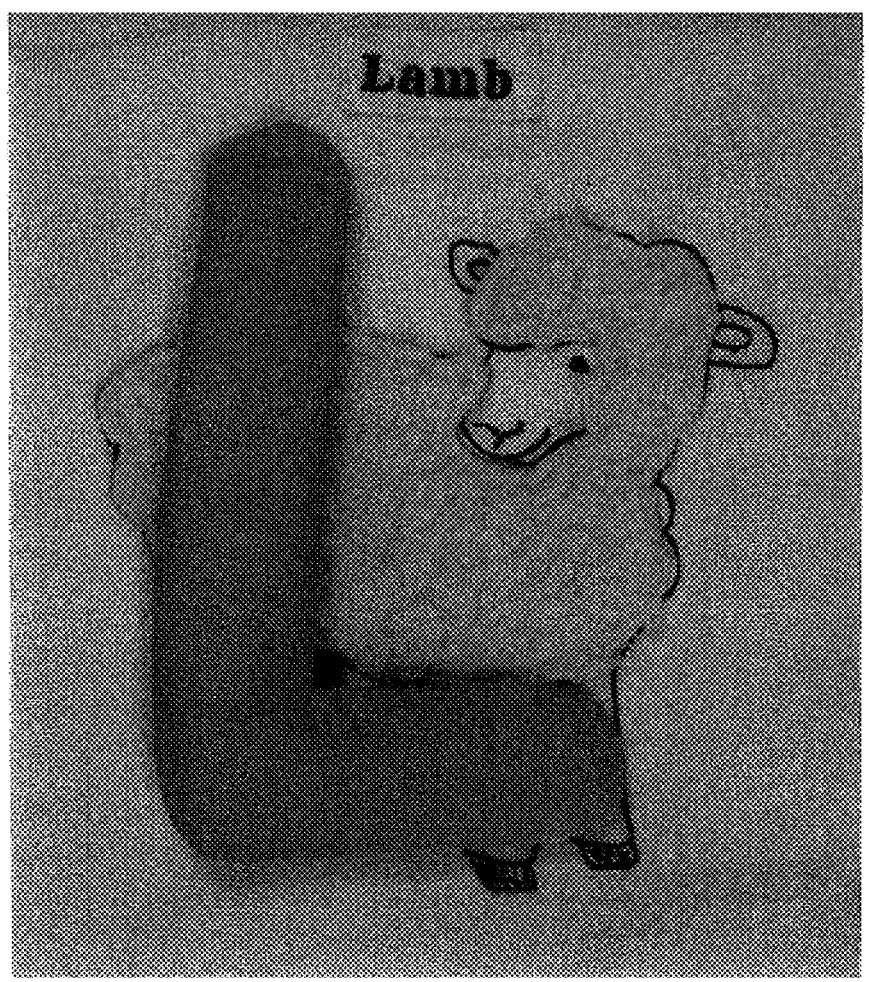
FIG. 10 is an enlarged view of a lamb under the letter "L" in FIG. 6 to better illustrate the tactile material used to represent the lamb.

FIG. 10 is an enlarged view of the lamb and the letter "L" under which it is placed. The letter "L", as with all of the other letters, is a hollow pattern that may be stuffed with soft material or material that may make a noise when touched to keep the attention of the child. The wool of the sheep may be cotton or other material shaped to look and feel like wool.

Figure 11:
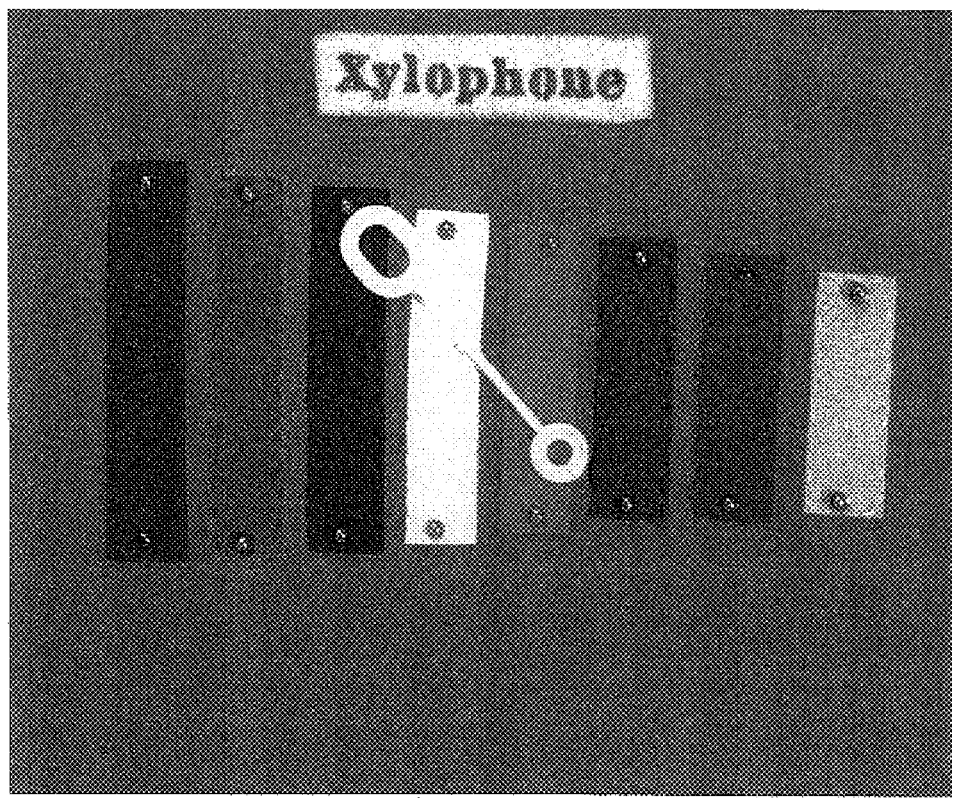
FIG. 11 is an enlarged view of the xylophone under the letter "X" in FIG. 6 to better illustrate the three-dimensional shape and the tactile material used to illustrate the xylophone.

FIG. 11 is an enlarged view of the xylophone that is under the letter "X" in FIG. 6 and illustrates the tactile material forming the xylophone. Each bar is of a different length and may be formed of a different color soft cotton material. The hammer may likewise be made of a soft material of any desired color.

As can be seen in FIG. 6, some of the objects are interactive with the user. For instance, the zipper under the letter "Z" can be zipped open and shut.

If desired, the sheet 10 shown in FIG. 1 may be formed with a front sheet and a back sheet attached to each other and stuffed with either a soft material or a noise making material that will hold a child's attention. Such noise making material may include bubble type packing material, Styrofoam material, cellophane, or any other desired material that makes a noise when touched.

All of the objects shown in the Fig.'s are preferably three-dimensional in form.

Thus, there has been disclosed a novel "touch-and-learn" medium such as a quilt/blanket/throw/covering/wall hanging that can be any size depending on its subject matter and its user size. It may have permanently attached thereto (e.g. stitched) objects such as images, shapes, forms, numbers, and the like. Each attached object has a unique texture that either mimics its subject or is otherwise palpably vivid and distinctive.

The novel educational medium can be used in a variety of ways: hung on a wall as decorative art, spread on a bed or on the floor, draped over furniture or used as a blanket or as a play area. It is made primarily of washable materials but is not to be so limited.

Examples and ideas of the thematic subject scenes or designs include, but are not limited to, the following themes, either individually or in combination.

Farm, zoo, circus, toy store, child's bedroom, beach, ocean, breeds of animals, mammals, reptiles, insects, fish, and musical instruments, either as an individual class or combined.

Cars, trucks, trains (possibly with boxcars carrying different items such as hay, toys, animals, and the like) and other items with wheels, flying devices such as kites, birds, airplanes, and the like.

Numbers in any sequence or otherwise.

With the present invention, the user can see the entire thematic scene such as a beach scene with sections or areas representing sand, water, and sky and having at least one tactile object in each section. With the novel educational medium, the user can interact with the scene and, for example, sit on the sand, walk in the water, and feel the clouds, airplanes, or other objects in the sky. The user can sleep under the novel sheet and can interact with objects thereon such as unzipping a zipper. The user can "feel" and see the image while interacting with it. Either the sheet itself or any of the objects can be stuffed with a noise making material to hold a child's attention.

While the invention has been set forth in relation to specific embodiments, it is to be understood that certain changes may be made in the novel invention without departing from the scope of the invention and it is intended that all matter contained in the above description or shown in the accompanying drawings are to be interpreted as illustrative and not in a limiting sense.

It is also to be understood that the following claims are intended to cover the generic and specific features of the invention herein described.

The invention claimed is:

1. An educational medium for teaching children to recognize various objects including one or more, in any combination, of animals, vegetables, minerals, articles, items, and environmental features according to a thematic scene associated with the medium, comprising:
   at least a single sheet of material having a surface with a plurality of the objects forming a part thereof, each of the objects having a three-dimensional shape and forming part of the thematic scene, the objects representing at least two of the group consisting of images, shapes, forms, letters, and numbers;
   each object relating to the other and to the background to form the thematic scene;
   a plurality of sections formed on the sheet of different colors to form an integrated thematic scene;
   at least one object permanently attached to each section;
   at least a portion of each object being tactile to enable a user to identify it by touch;
   at least one stuffed three-dimensional colored letter pivotally attached at least at one point to each section to allow the stuffed letter to be raised, thereby enabling the user to see and touch the object represented by the letter; and
   tactile material forming at least a part of each object and used to represent the texture of the actual object such that a user may both touch and see the tactile material to identify the object.

2. The educational medium of claim 1, wherein at least one of said stuffed letters is the first letter of a word identifying the object.

3. The educational medium of claim 1, wherein at least some of the stuffed letters contain noise-making material to hold a child's attention.

4. An educational medium according to claim 1, wherein said thematic scene is an environmental scene and said at least one letter indicates and relates to objects from said thematic scene.

* * * * *